United States Patent
Ko et al.

(10) Patent No.: US 6,657,694 B2
(45) Date of Patent: Dec. 2, 2003

(54) IN-PLANE SWITCHING LCD DEVICE HAVING SLANTED CORNER PORTIONS

(75) Inventors: Doo-Hyun Ko, Gumi-si (KR); Jun-Ho Lee, Daegu (KR)

(73) Assignee: LG.Philips LCD Co., Ltd., Seoul (KR)

( * ) Notice: Subject to any disclaimer, the term of this patent is extended or adjusted under 35 U.S.C. 154(b) by 97 days.

(21) Appl. No.: 09/974,842

(22) Filed: Oct. 12, 2001

(65) Prior Publication Data

US 2002/0044247 A1 Apr. 18, 2002

(30) Foreign Application Priority Data

Oct. 13, 2000 (KR) ........................... 2000-60450

(51) Int. Cl.[7] ........................................... G02F 1/1343
(52) U.S. Cl. ............................................... 349/141
(58) Field of Search .......................................... 349/141

(56) References Cited

U.S. PATENT DOCUMENTS 5,905,556 A * 5/1999 Suzuki et al. ............... 349/141
6,064,451 A 5/2000 Oh et al.
6,300,992 B1 * 10/2001 Fujimaki et al. ............ 349/128

FOREIGN PATENT DOCUMENTS

JP 05-203988 8/1993
KR 1998-0022593 7/1998

* cited by examiner

Primary Examiner—Robert H. Kim
Assistant Examiner—Andrew Schechter
(74) Attorney, Agent, or Firm—Birch, Stewart, Kolasch & Birch, LLP (57) ABSTRACT

A structure for an IPS LCD device, includes a plurality of common electrodes disposed over a pixel region of a substrate, a common line coupled with the plurality of common electrodes, a plurality of pixel electrodes on the pixel region, the plurality of pixel electrodes and common electrodes being arranged in an alternating manner with a predeterminned interval between adjacent common and pixel electrodes, and a first pixel connecting line coupled with the plurality of pixel electrodes and overlapping the common line, wherein a first corner portion where one of the pixel electrodes meets the first pixel connecting line is slanted with respect to that pixel electrode.

33 Claims, 6 Drawing Sheets

IN-PLANE SWITCHING LCD DEVICE HAVING SLANTED CORNER PORTIONS

RELATED APPLICATION

This application claims the benefit of Korean Patent Application No. 2000-60450, filed on Oct. 13, 2000, under 35 U.S.C. §119, the entirety of which is hereby incorporated by reference.

BACKGROUND OF THE INVENTION

1. Field of the invention

The present invention relates to a liquid crystal display device, and more particularly to a liquid crystal display device implementing in-plane switching (IPS) where an electric field to be applied to liquid crystal is generated in a plane parallel to a substrate.

2. Description of Related Art

Recently, light and thin liquid crystal display (LCD) devices with low power consumption are used in office automation equipment, video devices, and the like. Such LCDs typically use an optical anisotropy and spontaneous polarization of a liquid crystal (LC). The liquid crystal has thin and long liquid crystal molecules, which cause a directional alignment of the liquid crystal molecules. At this point, an alignment direction of the liquid crystal molecules is controlled by applying an electric field to the liquid crystal molecules. When the alignment direction of the liquid crystal molecules are properly adjusted, light is refracted along the alignment direction of the liquid crystal molecules to display image data. Of particular interest is an active matrix (AM) LCD, in which a plurality of thin film transistors and pixel electrodes are arranged in matrix array, because of its high resolution and superiority in displaying moving pictures. Driving methods for such LCDs typically include a twisted nematic (TN) mode and a super twisted nematic (STN) mode. A TN liquid crystal panel has high transmittance and aperture ratio. In addition, since the common electrode on the upper substrate serves as a ground, static electricity is prevented from destroying the liquid crystal panel.

Although TN LCDs and STN LCDs, which have the same structure, have been put to practical use, they have a drawback in that they have a very narrow viewing angle. In order to avoid the problem of narrow viewing angle, IPS LCD devices have been proposed. IPS LCD devices typically include a lower substrate where a pixel electrode and a common electrode are disposed, an upper substrate having no electrode, and a liquid crystal interposed between the upper and lower substrates. The IPS LCD device has advantages in contrast ratio, gray inversion, and color shift that are related to the viewing angle.

Figure 1A:
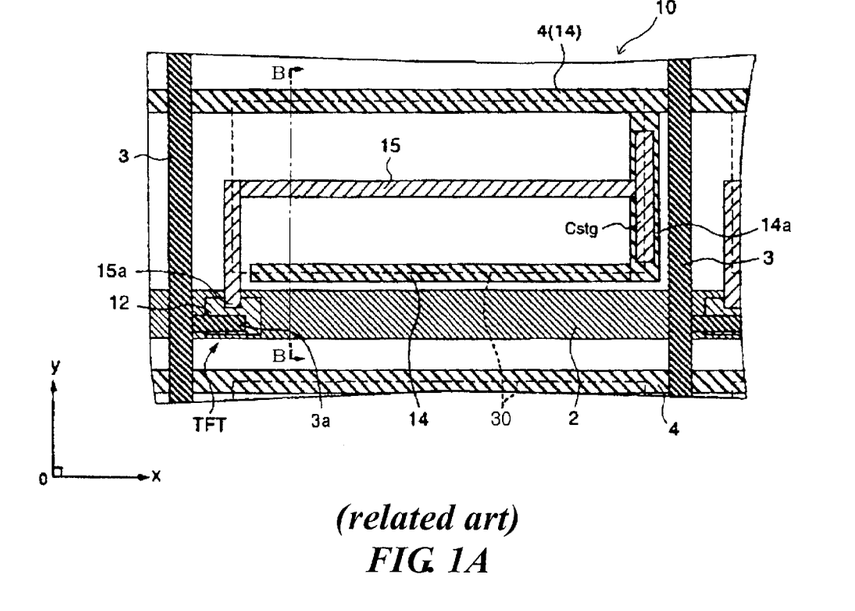
FIG. 1A is a plan view illustrating an IPS LCD device according to a related art.
Figure 1B:
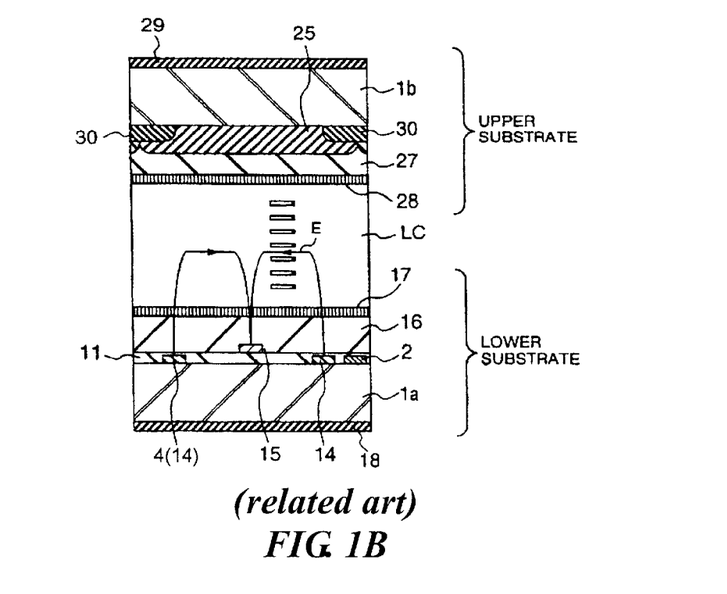
FIG. 1B is a cross-sectional view taken along a line "B—B" of FIG. 1A.

FIG. 1A is a detailed plan view showing a unit pixel region 10 of a typical IPS-LCD device. In addition, a cross-sectional view taken along a line "B—B" in FIG. 1A is illustrated in FIG. 1B.

On the surface of a transparent substrate 1a adjacent to the liquid crystal layer, a scan signal line 2 made of, for example, aluminum (Al) is formed extending along the x-direction, as shown in FIG. 1A. In addition, a reference signal line 4, also known as a common line, is formed extending along the x-direction, close to the scan signal line 2 on the +y-direction side thereof. The reference signal line 4 is also made of, for example, Al. A region surrounded by the scan signal line 2, the reference signal line 4, and video signal lines 3 constitutes the unit pixel region 10.

In addition, the unit pixel region 10 includes a reference electrode 14 formed by the reference signal line 4, and another reference electrode 14 formed adjacent to the scan signal line 2. The pair of horizontally extending reference electrodes 14 are positioned adjacent to one of a pair of video signal lines 3 (on the right side of FIG. 1A), and are electrically connected to each other through a conductive layer 14a, which is formed simultaneously with the reference electrodes 14.

In the structure described above, the reference electrodes 14 form a pair extending in the direction parallel to the scan signal line 2. In other words, the reference electrodes 14 form a strip extending in a direction perpendicular to the video signal lines 3.

As shown in FIGS. 1A and 1B, a first insulating layer 11 made of, for example, silicon nitride is formed on the surface of the lower substrate 1a on which the scan signal lines 2 are formed, thereby overlying the scan signal line 2, the reference signal lines 4, and the reference electrodes 14. The first insulating layer 11 functions as (a) an inter-layer insulating film for insulating the scan signal line 2 and the reference signal line 4 from the video signal lines 3, (b) as a gate-insulating layer for a region in which a thin film transistor (TFT) is formed, and (c) as a dielectric film for a region in which a capacitor "Cstg" is formed. The TFT includes a drain electrode 3a and a source electrode 15a. A semiconductor layer 12 for the TFT is formed near a crossing point of the gate and data lines (scan signal lines and video signal lines) 2 and 3. A first polarization layer 18 is formed on the other surface of the lower substrate 1a.

On the first insulating layer 11, a display electrode 15 is formed parallel with the reference electrode 14. One end portion of the display electrode 15 is electrically connected to the conductive layer 14a, and the other end portion thereof is electrically connected to the source electrode 15a. Still on the first insulating layer 11, a first planar layer 16 is formed to cover the display electrode 15. A first alignment layer 17 is formed on the first planar layer 16.

Under an upper substrate 1b, a black matrix 30 is disposed. A color filter 25 is formed to close an opening in the black matrix 30. A second planar layer 27 is placed to cover the color filter 25 and the black matrix 30. A second alignment layer 28 is placed under the surface of the second planar layer 27 facing the liquid crystal layer LC.

The color filter 25 is formed to define three unit pixel regions adjacent to and extending along the video signal line 3 and to position a red (R) filter, a green (G) filter, and a blue (B) filter, for example, from the top of the three unit pixel regions. The three unit pixel regions constitute one pixel region for color display.

A second polarization layer 29 is also arranged on the surface of the upper substrate 1b that is opposite to the surface of the upper substrate 1b adjacent to the liquid crystal layer LC, on which various layers are formed as described above.

It will be understood that in FIG. 1B, a voltage applied between the reference electrodes 14 and the display electrode 15 causes an electric field "E" to be generated in the liquid crystal layer LC in parallel with the respective surfaces of the lower and upper substrates 1a and 1b. This is why the illustrated structure is referred to as the in-plane switching LCD device, as mentioned above.

Figure 2:
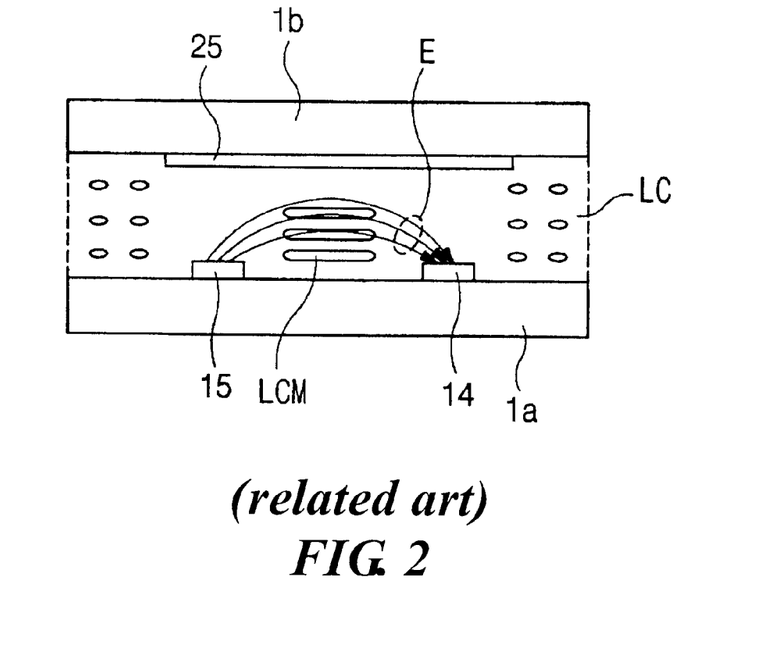
FIG. 2 is a conceptual cross-sectional view illustrating a typical IPS LCD device.
Figure 3A:
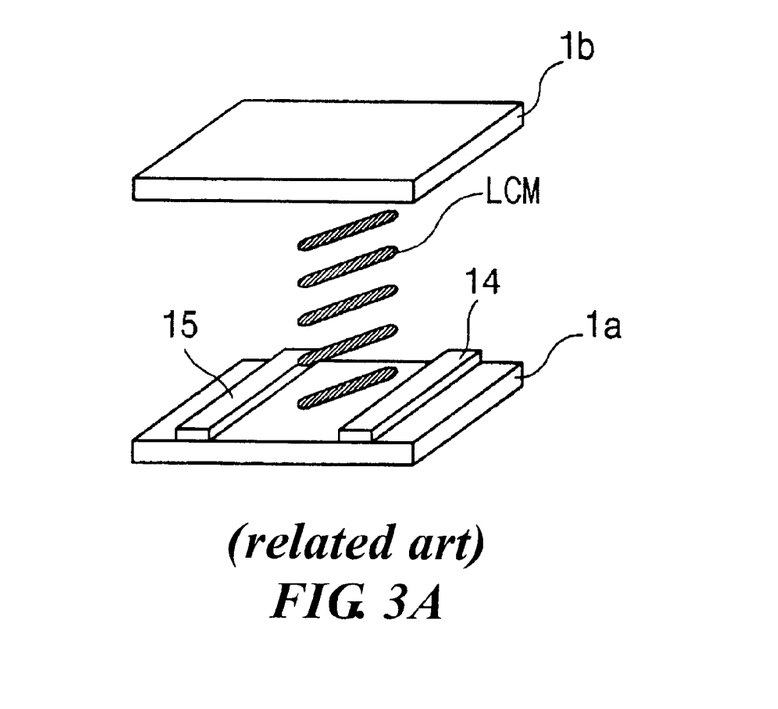
FIG. 3A is a perspective view illustrating "off state" of the IPS LCD device of FIG. 2.
Figure 3B:
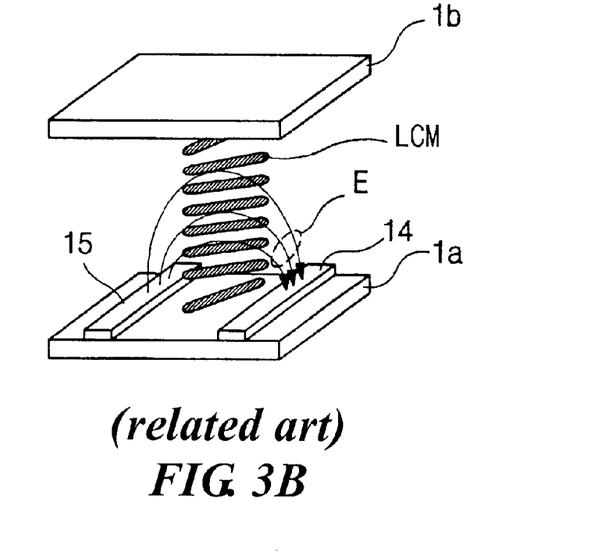
FIG. 3B is a perspective view illustrating "on state" of the IPS LCD device of FIG. 2.

With reference to FIGS. 2, 3A, and 3B, operation modes of a typical IPS LCD device are explained in detail.

FIG. 2 is a conceptual cross-sectional view illustrating the operation of the typical IPS LCD device. As shown, first and second substrates 1a and 1b are spaced apart from each other, and a liquid crystal LC is interposed therebetween. The first and second substrates 1a and 1b are called an array substrate and a color filter substrate, respectively. On the first substrate 1a, pixel and common electrodes 15 and 14 are disposed. The pixel and common electrodes 15 and 14 are parallel with and spaced apart from each other. On a surface of the second substrate 1b, a color filter 25 is disposed opposing the first substrate 1a. The pixel and common electrodes 15 and 14 apply an electric field "E" to the liquid crystal molecules LCM. The liquid crystal molecules LCM have a negative dielectric anisotropy, and thus are aligned parallel to the electric field "E". The pixel electrode 15 and common electrode 14 are the display electrode 15 and reference electrode 14 of FIG. 1B, respectively.

FIGS. 3A and 3B illustrate operation modes for the typical IPS-LCD device shown in FIG. 2. During the off-state, the long axes of the liquid crystal molecules LCM maintain some angle with respect to an invisible line that is perpendicular to the pixel and common electrodes 15 and 14. The angle is 45 degrees, for example. At this point, the pixel and common electrode 15 and 14 are parallel with each other.

During the on-state, an in-plane electric field "E", which is parallel to the surface of the first substrate 1a, is generated between the pixel and common electrodes 15 and 14. The reason is that the pixel electrode 15 and common electrode 14 are formed together on the first substrate 1a. Then, the liquid crystal molecules LCM are twisted such that the long axes thereof coincide with the electric field direction. Thereby, the liquid crystal molecules LCM are aligned such that the long axes thereof are perpendicular to the pixel and common electrodes 15 and 14. The liquid crystal used in the above-mentioned IPS LCD device includes a negative dielectric anisotropy.

Figure 4:
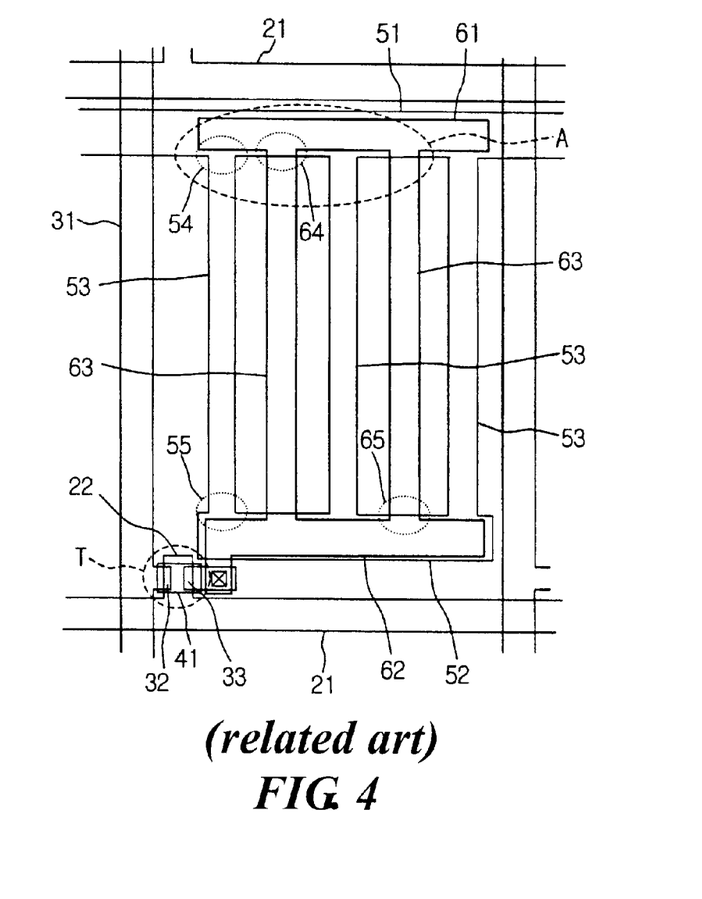
FIG. 4 is a plan view illustrating an IPS LCD device according to a related art.
Figure 5A:
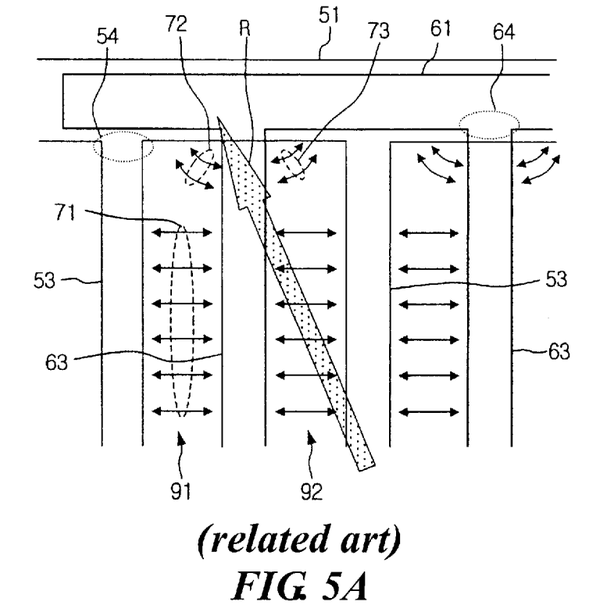
FIGS. 5A and 5B are expanded plan views showing a portion "A" of FIG. 4.
Figure 5B:
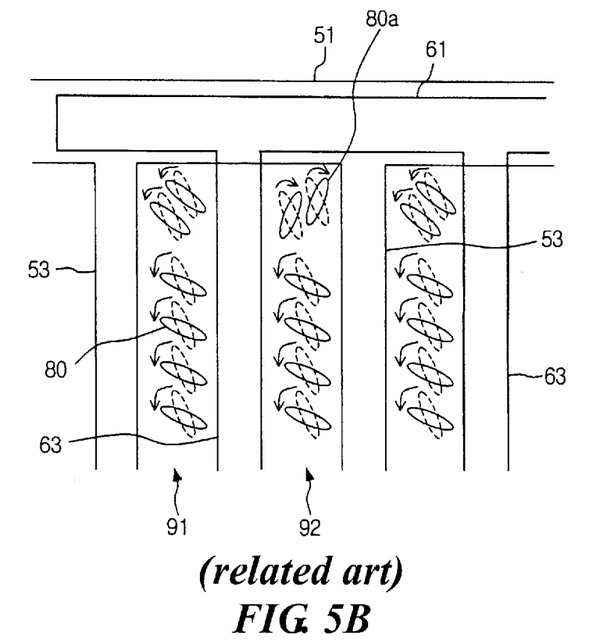

Referring now to FIGS. 4, 5A, and 5B, problems of a conventional IPS LCD device are explained.

FIG. 4 shows a lower substrate of the IPS LCD device according to a related art. A gate line 21 and a common line 51 are arranged parallel to each other, and a data line 31 is arranged perpendicular to the gate and common lines 21 and 51. At a crossing portion of the gate and data lines 21 and 31, a gate electrode 22 and a source electrode 32 are disposed. The gate and source electrodes 22 and 32 are integrally connected with the gate line 21 and the data line 31, respectively. The source electrode 32 overlaps a portion of the gate electrode 22. In addition, a drain electrode 33 is disposed opposite to the source electrode 32 with an interval therebetween, and an active layer 41 made of an amorphous silicon is disposed under the source and drain electrodes 32 and 33.

A plurality of common electrodes 53 are disposed perpendicular to the common line 51 and connected thereto at a first common crossing portion 54. The plurality of common electrode 53 are spaced apart from each other with a predetermined interval therebeetween and further connected with a common connecting line 52 at a second common crossing portion 55. The common connecting line 52 is disposed opposing to the common line 51.

A plurality of pixel electrodes 63 are disposed perpendicular to a first pixel connecting line 61 and a second pixel connecting line 62 and connected thereto at a first pixel crossing portion 64 and at a second pixel crossing portion 65, respectively. The first and second pixel connecting lines 61 and 62 are preferably disposed over the common line 51 and the common connecting line 52, respectively. Specifically, the second pixel connecting line 62 is electrically connected with the drain electrode 33 of the TFT labelled "T". The plurality of common electrodes 53 and the pixel electrodes 63 are spaced apart from each other with a predetermined interval therebetween and arranged in an alternating pattern. Therefore, each common electrode 53 is parallel to an adjacent pixel electrode 63.

For the above-described conventional IPS LCD device, the first and second alignment layers 17 and 28 (in FIG. 1B) are used to control a first alignment state of the liquid crystal layer LC (in FIG. 1B). The alignment layers were already rubbed in a definite rubbing direction that corresponds to a desired first alignment state of the liquid crystal layer. Therefore, when the liquid crystal layer is injected into the IPS LCD device, it is aligned in accordance with the rubbing direction of the alignment layers such that the first alignment state thereof is achieved.

When an electric field "E" (in FIG. 1B) is generated between the common electrode 53 and the pixel electrode 63, molecules of the liquid crystal layer are aligned in accordance with the electric field direction, which forms certain angles with the rubbing direction. The electric field should be uniform throughout an interval between the common electrode 53 and the adjacent pixel electrode 63 to achieve a high display quality. However, in the conventional IPS LCD device shown in FIG. 4, the electric field is usually distorted at the common connecting portions 54, 55 and at the pixel connecting portions 64, 65, thereby causing a disclination. A detailed explanation will be provided with reference to FIGS. 5A and 5B.

In FIG. 5A, before electrical signals are applied to the common electrode 53 and the pixel electrode 63, liquid crystal molecules 80 (in FIG. 5B) are aligned according to a rubbing direction "R" of the alignment layers. The rubbing direction "R" is preferably at an angle of 10 to 20 degrees with respect to the pixel electrode 63.

When electrical signals are applied, a uniform electric field 71 is generated between the common electrode 53 and the pixel electrode 63, and distorted electric fields 72 and 73 are generated at the first common and pixel connecting portions 54 and 64. The uniform electric field 71 is uniformly perpendicular to the common and pixel electrodes 53 and 63. However, the distorted electric fields 72 and 73 are rounded and appear opposite to corners where the common electrode 53 and the pixel electrode 63 communicate with the common line 51 and the pixel connecting line 61, respectively. At this point, the distorted electric field 72 in a first sub-pixel region 91 and the other distorted electric field 73 in a second sub-pixel region 92 are symmetrical with respect to the pixel electrode 63 centered between the first and second regions 91 and 92.

As shown in FIG. 5B, the liquid crystal molecules 80 rotate in accordance with not only the uniform electric field 71 (in FIG. 5A) but also with the distorted electric fields 72 and 73 (in FIG. 5A). In the first sub-pixel region 91, all of the liquid crystal molecules 80 rotate in a counterclockwise direction, regardless of the difference between the uniform electric field 71 (in FIG. 5A) and the distorted electric field 72 (in FIG. 5A). In the second sub-pixel region 92, however, a portion 80a of the liquid crystal molecules 80 rotates in a clockwise direction in accordance with the other distorted electric field 73 (in FIG. 5A), thereby causing an abnormal alignment at these corner portions. The abnormal alignment of the portion 80a results in the disclination, thereby deteriorating the display qualities including brightness and viewing angle of the IPS LCD device.

SUMMARY OF THE INVENTION

To overcome the problems described above and other problems, an embodiment of the present invention provides an IPS LCD device, which has improved display qualities. The present invention, in part, provides an array substrate for an IPS LCD device, the array substrate including: a gate line and a data line on a substrate, the gate and data lines perpendicularly crossing with each so as to define a pixel region; a thin film transistor electrically connected with the gate line and the data line; a plurality of common electrodes disposed on the pixel region, each common electrode being parallel to the data line; a common line connecting with the plurality of common electrodes, the common line being parallel to the gate line; a plurality of pixel electrodes on the pixel region, the plurality of pixel electrodes and common electrodes being arranged in an alternating order with a predeterminned interval between the adjacent common and pixel electrodes; and a first pixel connecting line connecting with the plurality of pixel electrodes and overlapping the common line, wherein a corner portion where the pixel electrode meets the first pixel connecting line is slanted with respect to the corresponding pixel electrode. The corner portion is preferably slanted to have an angle of greater than 90 and less than 180 degrees with respect to the corresponding pixel electrode.

Optionally, in one embodiment, at least one corner portion where the common electrode meets the common line is slanted with respect to the corresponding common electrode. In that case, the corner portion where the common electrode meets the common line and the corner portion where the pixel electrode meets the first pixel connecting line preferably oppose each other in a same sub-pixel region defined by the adjacent pixel and common electrodes.

In another aspect, the array substrate further includes a common connecting line connected with the plurality of common electrodes in the opposite direction of the common line. At least one corner portion where the common electrode meets the common connecting line is slanted with respect to the corresponding common electrode.

In another aspect, the array substrate further includes a second pixel connecting line connected with the plurality of pixel electrodes in the opposite direction of the first pixel connecting line. At least one corner portion where the pixel electrode meets the second pixel connecting line is slanted with respect to the corresponding pixel electrode.

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention.

In the accompanying drawings, like reference numerals denote like parts.

DETAILED DESCRIPTION OF PREFFERED EMBODIMENTS

Reference will now be made in detail to example embodiments of the present invention, example of which is illustrated in the accompanying drawings.

Figure 6:
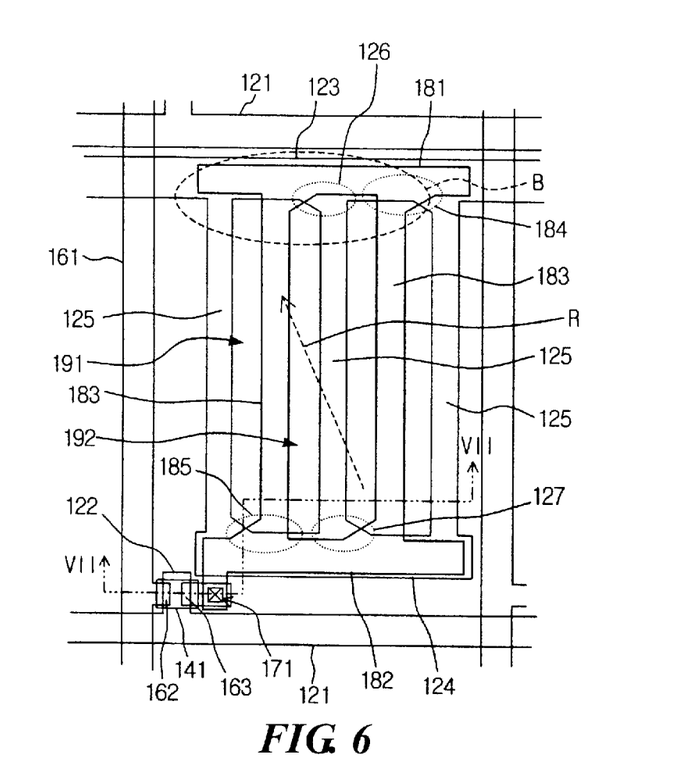
FIG. 6 is a plan view illustrating an IPS LCD device according to an embodiment of the present invention.
Figure 7:
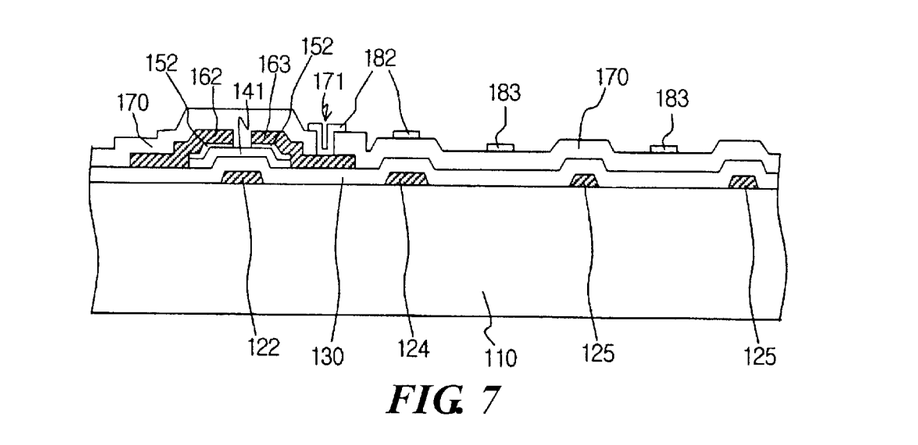
FIG. 7 is a cross-sectional view taken along a line "VII—VII" of FIG. 6 according to an embodiment of the present invention.

FIG. 6 is a plan view illustrating an IPS LCD device according to an embodiment of the present invention, and FIG. 7 is a cross-sectional view taken along a line "VII—VII" of FIG. 6.

As shown in FIGS. 6 and 7, gate lines 121 each including at least one gate electrode 122 are formed in a transverse direction on a substrate 110. Between the gate lines 121, a plurality of common electrodes 125 are formed perpendicular to the gate lines 121. A common line 123 and a common connecting line 124 parallel to the gate line 121 are formed at both ends of the plurality of common electrodes 125, respectively. Specifically, each common electrode 125 is connected with the common line 123 at a first common connecting portion 126, and connected with the common connecting line 124 at a second common connecting portion 127. The common connecting line 124 is optional and may not be included necessarily in an IPS LCD device depending on the application.

The gate line 121, the common line 123, the common connecting line 124, and the common electrode 125 are preferably made of an opaque metal, but can be made of other suitable materials. The opaque metal preferably can be at least one of chromium (Cr), aluminum (Al), aluminum alloy (Al alloy), molybdenum (Mo), tantalum (Ta), tungsten (W), antimony (Sb), alloys thereof, or alloy mixture thereof.

A gate insulating layer 130 covers the gate line 121, the common line 123, the common connecting line 124, and the common electrode 125 formed on a substrate 110. An active layer 141 made of, e.g., an amorphous silicon layer is formed on the gate insulating layer 130 over the gate electrode 122, and an ohmic contact layer 152 made of, e.g., a doped amorphous silicon layer is formed on the active layer 141.

Further on the gate insulating layer 130, data lines 161 crossing the gate lines 121 are formed. A source electrode 162 extending from the data line 161 and a drain electrode 163 spaced apart from the source electrode 162 are formed on the ohmic contact layer 152. Similar to the gate line 121, the data line 161, the source electrode 162, and the drain electrode 163 are preferably made of a conductive material, e.g., a metal.

A passivation layer 170 covers the data line 161, the source electrode 162, and the drain electrode 163. The passivation layer 170 is preferably made of, e.g., silicon oxide ($SiO_2$), silicon nitride ($SiN_x$), or other suitable materials, and includes a contact hole 171 that exposes a portion of the drain electrode 163.

On the passivation layer 170, a first pixel connecting line 181 and a second pixel connecting line 182 are formed overlapping the common line 123 and the common connecting line 124, respectively. Between the first and second pixel connecting lines 181 and 182, a plurality of pixel electrodes 183 are formed in an alternating order with the plurality of common electrodes 125. At this point, each pixel electrode 183 is spaced apart from the adjacent common electrode 125 with a predetermined interval therebetween.

The pixel electrode 183 is connected with the first and second pixel connecting lines 181 and 182 at a first pixel connecting portion 184 (i.e., a portion of the first pixel connecting line 181) and at a second pixel connecting portion 185 (i.e., a portion of the second pixel connecting line 182), respectively. The second pixel connecting line 182 is electrically connected with the drain electrode 163 via the contact hole 171. However, in another embodiment, one of the first and second pixel connecting lines 181 and 182 may not be included in the IPS LCD device according to the present invention. In that case, the pixel electrode 183 is directly connected with the drain electrode 163.

The first and second pixel connecting lines 181 and 182, and the pixel electrodes 183 are preferably made of a transparent conductive material but may be made of an opaque conductive material such as a metal, or other suitable material. The transparent conductive material can be at least one of indium tin oxide (ITO), indium zinc oxide (IZO), or a mixture thereof. If the opaque conductive material such a metal is selected for the pixel electrode 183, the pixel electrode 183 and the like can be formed using the same process of forming the data line 161 and the like, thereby decreasing the number of processes being performed in the fabrication stage. In that case, the contact hole 171 of the passivation layer 170 may not be needed.

Liquid crystal molecules are aligned in accordance with a rubbing direction "R" of alignment layers (not shown) in a first alignment state. The rubbing direction "R" is preferably at about 10 to 20 degrees in angle with respect to the pixel electrode 183. In another embodiment, the alignment layer may be photo-aligned instead of being rubbed. The rubbing direction "R" is alternatively referred to as a first alignment direction, because the liquid crystal molecules are aligned in accordance with the rubbing direction "R" when no electric field is applied to the liquid crystal molecules.

In the IPS LCD device according to an embodiment, the first and second pixel connecting portions 184 and 185 have slanted corners or corner portions defining obtuse angles with respect to the pixel electrodes 183. Further, the first and second common connecting portions 126 and 127 also have slanted corners or corner portions defining obtuse angles with respect to the common electrodes 125, respectively. Because of the slanted corners, liquid crystal molecules disposed between adjacent pixel and common electrodes 183 and 125 are uniformly aligned in accordance with an electric field applied between the adjacent pixel and common electrodes 183 and 125. Specifically, the second pixel connecting portion 185 in a first sub-pixel region 191 and the first common connecting portion 126 in a second pixel region 192 have the slanted corners. A detailed explanation is provided with reference to FIGS. 8A and 8B illustrating expanded plan views of the region in FIG. 6.

Figure 8A:
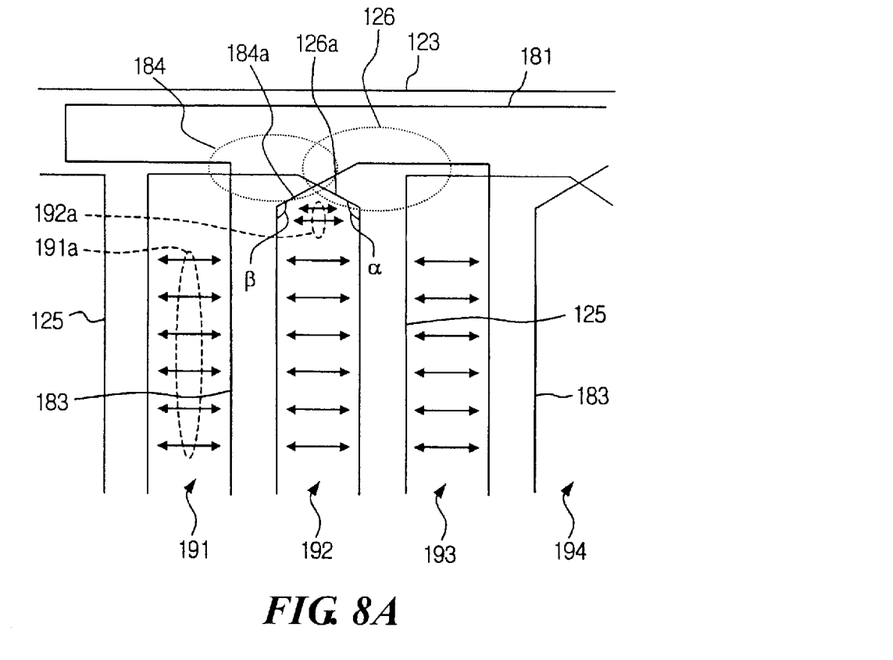
FIGS. 8A and 8B are expanded plan views showing a region "B" of FIG. 6 according to an embodiment of the present invention.
Figure 8B:
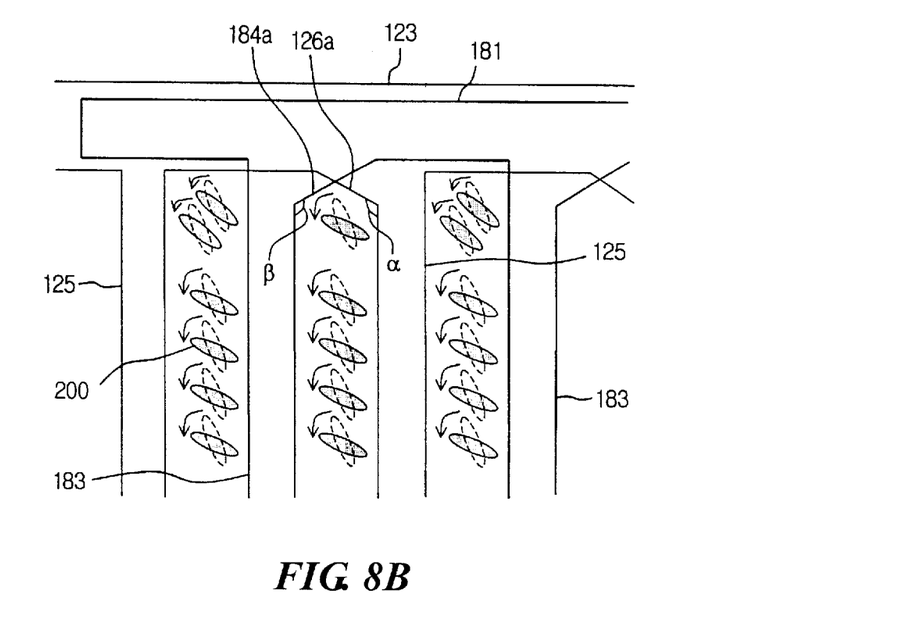

Referring to FIG. 8A, the first common connecting portion 126 positioned at the upper portion of the common electrode 125 in the second sub-pixel region 192 has a slanted corner 126a slanted to the adjacent common electrode 125 in the same sub-pixel region 192. The slanted corner 126a forms an obtuse angle α in the range of above 90 to below 180 degrees with the connected common electrode 125. Advisably, the obtuse angle α ranges from 100 to 150 degrees in a preferred embodiment. In addition, the first pixel connecting portion 184 positioned at the upper portion of the pixel electrode 183 in the second sub-pixel region 192 has a slanted corner 184a slanted with respect to the adjacent common electrode 125 in the same sub-pixel region 192. The slanted corner 184a forms an obtuse angle β in the range of above 90 to below 180 degrees with the connected pixel electrode 183. Advisably, the obtuse angle β ranges from 100 to 150 degrees in the preferred embodiment. In this manner, the slanted corner 126a of the first common connecting portion 126 and the slanted corner 184a of the first pixel connecting portion 184 are slanted to cross each other in the second sub-pixel region 192.

In a fourth sub-pixel region 194 and other corresponding regions, each of the first pixel and common connecting portions 184 and 126 has the slanted corner discussed above in connection with the second sub-pixel region 192. The other corners of the first pixel and common connecting portions 184 and 126 in the second and fourth sub-pixel regions 192 and 194 are not slanted but are at 90 degrees in angle. In the first sub-pixel region 191 and a third sub-pixel region 193, however, not the first ones but the second pixel and common connecting portions 185 and 127 of FIG. 6 have the same slanted corners discussed above in connection with the second sub-pixel region 192.

When electrical signals are applied to the common electrode 125 and the pixel electrode 183, a first electric field 191a is generated therebetween, and a second electric field 192a is generated between the first common and pixel connecting portions 126 and 184. Because of the slanted corners 126a and 184a of the first common and pixel connecting portions 126 and 184, the second electric field 192a is perpendicular to the common and pixel electrodes 125 and 183 similar to the first electric field 191a. Thus, a uniform electric field is formed throughout one sub-pixel region in the IPS LCD device according to the embodiment of the present invention. Accordingly, as shown in FIG. 8B, all of liquid crystal molecules 200 rotate in the same direction, e.g., a counterclockwise direction, thereby occurring no disclination and improving the performance of the IPS LCD device.

The slanted corners 126a and 184a preferably have the same angle to be symmetrical with each other, but may have different angles so as to rotate the liquid crystal molecules 200 in a desired direction, e.g., counterclockwise direction. For example, when the rubbing direction "R" in FIG. 6 is at about 10° to 20° angle in the left of the common electrode 125, if only the first pixel connecting portion 184 has the slanted corner 184a, the first common connecting portion 126 may not necessarily need the slanted corner 126a but can have a 90 degree angled corner instead. In addition, when the rubbing direction "R" is at about 10° to 20° angle in the right of the common electrode 125, if only the first common connecting portion 126 has the slanted corner 126a, the first pixel connecting portion 184 may not necessarily need the slanted corner 184a but can have a 90 degree angled corner instead.

Optionally, the slanted corners may also be formed at the first common connecting portion 126 and the first pixel connecting portion 184 of the first or third sub-pixel regions 191 and 193 as well as the second and fourth sub-pixel regions 192 and 194. In that case, all the liquid crystal molecules 200 also rotate in the same direction, thereby preventing the disclination.

In another aspect, the rubbing direction "R" in FIG. 6 may be differently formed, for example, about 10 to 20 degrees in the right with respect to the common electrode 125. In that case, the slanted corners 126a and 184a are preferably formed at the first common and pixel connecting portions 126 and 184 of the first and third sub-pixel regions 191 and 193 and at the second common and pixel connecting portions of the second and fourth sub-pixel regions 192 and 194. Accordingly, all the liquid crystal molecules 200 rotate in the desired clockwise direction when the electrical signals are applied to the pixel and common electrodes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A structure usable in an IPS LCD device, comprising:
   a plurality of common electrodes disposed over a pixel region of a substrate;
   a common line coupled with the plurality of common electrodes;
   a plurality of pixel electrodes on the pixel region, the plurality of pixel electrodes and common electrodes being arranged in an alternating manner with a predetermined interval between adjacent common and pixel electrodes; and
   a first pixel connecting line coupled with the plurality of pixel electrodes,
   wherein a first corner portion where a first one of the pixel electrodes meets the first pixel connecting line is slanted with respect to the first one of the pixel electrodes,
   wherein a second corner portion where a first one of the common electrodes meets the common line is slanted with respect to the first one of common electrodes, and
   wherein the second corner portion and the first corner portion cross each other in a same sub-pixel region defined by the first one of the pixel electrodes and the first one of the common electrodes.

2. The structure of claim 1, wherein the first corner portion is slanted to have a first obtuse angle with respect to the first one of the pixel electrodes.

3. The structure of claim 2, wherein the first obtuse angle ranges from about 100 to 150 degrees.

4. The structure of claim 1, wherein the second corner portion is slanted to have a second obtuse angle with respect to the first one of the common electrodes.

5. The structure of claim 4, wherein the second obtuse angle ranges from about 100 to 150 degrees.

6. The structure of claim 1, further comprising:
   a gate line and a data line on the substrate; and
   a thin film transistor electrically connected with the gate line and the data line.

7. The structure of claim 1, wherein the first pixel connecting line overlaps the common line.

8. The structure of claim 1, further comprising:
   a common connecting line connected with the plurality of common electrodes in an opposite direction of the common line.

9. The structure of claim 8, wherein a fifth corner portion where a second one of the common electrodes meets the common connecting line is slanted with respect to the second one of the common electrodes.

10. The structure of claim 8, wherein a third corner portion where the first one of the common electrodes meets the common connecting line is slanted with respect to the first one of the common electrodes.

11. The array substrate of claim 10, wherein the third corner portion is slanted to have a third obtuse angle with respect to the first one of the common electrodes.

12. The structure of claim 11, wherein the third obtuse angle ranges from about 100 to 150 degrees.

13. The structure of claim 9, further comprising:
   a second pixel connecting line connected with the plurality of pixel electrodes in an opposite direction of the first pixel connecting line.

14. The structure of claim 13, wherein a fourth corner portion where a second one of the pixel electrodes meets the second pixel connecting line is slanted with respect to the second one of the pixel electrodes.

15. The structure of claim 14, wherein the third corner portion and the fourth corner portion cross each other in a same sub-pixel region defined by the second one of the pixel electrodes and the first one of the common electrodes.

16. The display device of claim 14, wherein the third corner portion and the fourth corner portion cross each other.

17. The structure of claim 14, wherein the fourth corner portion is slanted to have a fourth obtuse angle with respect to the second one of the pixel electrodes.

18. The structure of claim 17, wherein the fourth obtuse angle ranges from about 100 to 150 degrees.

19. A display device comprising:
   a plurality of common electrodes disposed over a pixel region of a substrate;
   a common line coupled with the plurality of common electrodes;
   a common connecting line connected with the plurality of common electrodes in an opposite direction of the common line;
   a plurality of pixel electrodes on the pixel region, the plurality of pixel electrodes and common electrodes being arranged in an alternating manner with a predetermined interval therebetween; and
   a first pixel connecting line coupled with the plurality of pixel electrodes and overlapping the common line;
   wherein a first corner portion where one of the common electrodes meets the common line is slanted with respect to the one of the common electrodes,
   wherein a second corner portion where the one of the common electrodes meets the common connecting line is slanted with respect to the one of the common electrodes,
   wherein a third corner portion where one of the pixel electrodes meets the first pixel connecting line is slanted with respect to the one of the pixel electrodes, and
   wherein the third corner portion and the first corner portion cross each other in a same sub-pixel region.

20. The display device of claim 19, wherein the display device is an in-plane switching LCD device.

21. The display device of claim 19, wherein the first corner portion is slanted to have an obtuse angle with respect to the one of the common electrodes.

22. The display device of claim 21, wherein the obtuse angle ranges from about 100 to 150 degrees.

23. The display device of claim 19, wherein a fourth corner portion where another one of the common electrodes meets the common connecting line is slanted with respect to the another one of the common electrodes.

24. The display device of claim 23, further comprising:
a second pixel connecting line connected with the plurality of pixel electrodes in an opposite direction of the first pixel connecting line.

25. The display device of claim 24, wherein a fifth corner portion where the one of the pixel electrodes meets the second pixel connecting line is slanted with respect to the one of the pixel electrodes.

26. The display device of claim 25, wherein the second corner portion and the fourth corner portion are parallel to each other.

27. The display device of claim 25, wherein the fourth corner portion and the fifth corner portion cross each other in a same sub-pixel region.

28. The display device of claim 24, wherein a sixth corner portion where another one of the pixel electrodes meets the second pixel connecting line is slanted with respect to the another one of the pixel electrodes.

29. The display device of claim 28, wherein the second corner portion and the sixth corner portion cross each other in a same sub-pixel region.

30. The display device of claim 28, wherein the fifth corner portion and the sixth corner portion are parallel to each other.

31. A structure usable in an IPS LCD device, comprising:
a plurality of common electrodes disposed over a pixel region of a substrate;
a common line coupled with the plurality of common electrodes;
a plurality of pixel electrodes on the pixel region, the plurality of pixel electrodes and common electrodes being arranged in an alternating manner with a predetermined interval between adjacent common and pixel electrodes;
a first pixel connecting line coupled with the plurality of pixel electrodes and overlapping the common line, wherein a first corner portion where a first one of the pixel electrodes meets the first pixel connecting line is slanted with respect to the first one of the pixel electrodes;
a common connecting line connected with the plurality of common electrodes in an opposite direction of the common line, wherein a third corner portion where the first one of the common electrodes meets the common connecting line is slanted with respect to the first one of the common electrodes; and
a second pixel connecting line connected with the plurality of pixel electrodes in an opposite direction of the first pixel connecting line,
wherein a fourth corner portion where a second one of the pixel electrodes meets the second pixel connecting line is slanted with respect to the second one of the pixel electrodes, and
wherein the third corner portion and the fourth corner portion cross each other in a same sub-pixel region defined by the second one of the pixel electrodes and the first one of the common electrodes.

32. A structure usable in a display device, comprising:
a plurality of common electrodes over a pixel region of a substrate;
a common line coupled to the plurality of common electrodes;
a plurality of pixel electrodes on the pixel region, the plurality of pixel electrodes and common electrodes being arranged in an alternating manner; and
a first pixel connecting line coupled with the plurality of pixel electrodes,
wherein a first corner portion where a first one of the pixel electrodes meets the first pixel connecting line is slanted, and a second corner portion where a first one of the common electrodes meets the common line is slanted, such that the first corner portion is slanted non-parallel to the second corner portion being slanted.

33. The structure of claim 32, wherein the first and second corner portions cross each other.

* * * * *